March 31, 1953 — W. E. JECKELL — 2,633,186
DETACHABLE ARMREST SHIELD
Filed May 25, 1950
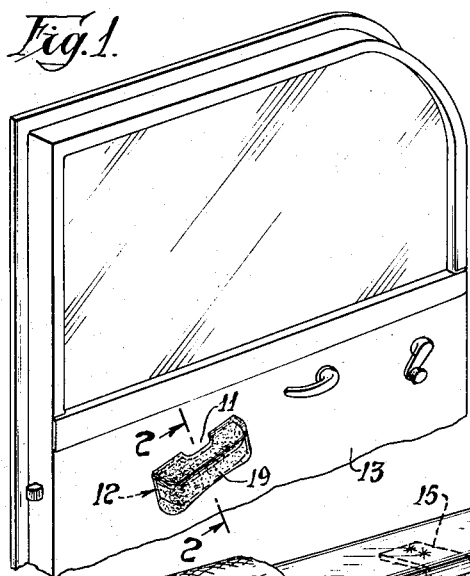

Patented Mar. 31, 1953

2,633,186

UNITED STATES PATENT OFFICE 2,633,186

DETACHABLE ARMREST SHIELD

Walter E. Jeckell, Huntington Park, Calif., assignor of one-half to Dorian E. Lane, South Gate, Calif.

Application May 25, 1950, Serial No. 164,196

9 Claims. (Cl. 155—182)

My invention relates to an armrest shield detachably mountable upon the conventional armrest of an automobile door.

The conventional armrest, particularly the one on the automobile door which is on the side of the driver, is subject to severe usage due to the numerous shiftings of the driver in his seat and especially in the maneuvering of his left arm from steering to rest positions. Also the armrest, being provided with a hand-grip aperture is used as an auxiliary means for closing the door and to retard the opening swing thereof in order to prevent injury to the door's hinges on account of the gravity hung condition of the door accelerating its opening movement.

In so far as it has been possible to ascertain, no provision has heretofore been made to prevent the upholstery of automobile armrests from presenting a shabby appearance due to wear or to the application of soiled hands thereto.

Accordingly it is one of the principal aims of the present invention to provide a detachable armrest shield or cover which can be applied to a conventional armrest carried by the automobile door when the car is purchased and subsequently removed when the car is turned in on a new one or sold as a used car so that the car owner may realize a greater exchange or resale value.

It is also an object of the invention to provide an armrest shield which can be covered with upholstery simulating that of the seat and adjacent structure and which can be easily applied and detached, at will, whenever necessary.

Yet another object is to provide as a new article of manufacture a novel armrest shield which is simple, easy to construct and not too expensive to have a ready sale.

Other objects, advantages and features of invention will hereinafter appear.

Referring to the drawing wherein is shown preferred embodiments of the invention, Fig. 1 is a perspective view of a fragment of an automobile door showing the device applied to the armrest thereof.

Fig. 2 is an enlarged section indicated by the plane of the line 2—2 in Fig. 1.

Fig. 3 is a perspective view of the frame or shell of the device shown in Figs. 1 and 2 with the upholstery partly removed and with the locking tongue in the unbent position.

Fig. 4 is a perspective view of the armrest shield when made of plastic and unupholstered.

Fig. 5 is a section on line 5—5 of Fig. 4.

Referring in detail to the drawing, in Fig. 3 is shown a partly upholstered metal shield frame 6 consisting of a horizontal top wall 7, an apron wall 8 depending from one long edge of said top wall, and end walls 9.

In the midlength portion of said top wall 7 a recess is cut into the edge thereof, said top wall 7 having a downwardly directed flange 10 bordering said recess from end to end and side to side. Said flange is contoured to be fitted downwardly into the hand-grip aperture 11 of a conventional armrest 12 fastened to the car door 13.

In order to clamp the shield 6 in place upon the conventional armrest 12, said shield is provided with a bendable locking tongue 14 of an inverted L-shaped character, the short limb 15 of the L being welded or otherwise secured to the under side of the midlength portion of the aforesaid top wall 7 of the shield, in such a position that, when the shield is applied to the arm rest as shown in Fig. 2, the tongue 14 will overlie in a flatwise manner the inner side of the aforesaid vertical, hand-grip aperture 11 through the permanently secured conventional arm rest 12. After the shield has thus been put into place the lower end portion, designated 16 in Fig. 2, is forwardly bent so as to provide a locking element that will securely maintain the shield in its applied position.

The shield may be provided with a covering 19 which matches or harmonizes with adjacent upholstery of the car. A cushioning pad 20 may be placed atop and over the front face of the apron portion of the shield to provide a more comfortable support for the arm when resting thereon or when in an abutting relation thereto. The aforesaid fabric layer 19 may have inturned marginal portions 21 glued or otherwise secured to the inner surface of the shield.

The unupholstered plastic shield 6a shown in Figs. 4 and 5 is of substantially the same shape as the shield described in Fig. 3 except that the flange 10 bordering the cut out part of the top wall is omitted and the short limb 15a of the bendable tongue 14a is molded into the plastic at the time the shield is manufactured.

When the device is made of a plastic substance, upholstering will be omitted, thus lessening the cost of the article without detracting from its ornamental appearance. The remaining parts of the shield shown in Fig. 4 are lettered the same as in views 1, 2 and 3.

What I claim is:

1. A shield detachably mountable upon an automobile door armrest of the type having a hand grip aperture, said shield comprising an elongated, substantially rectangular top wall, an apron wall and end walls depending from said top wall, and a tongue depending from said top wall to project downwardly into said aperture and co-operate with said apron and end walls to hold the shield in a protective relation to said armrest.

2. The subject matter of claim 1 and said tongue being of sufficient length to project below said aperture when the shield is in its mounted position upon the armrest, the lower end portion of said tongue being bent away from said door so as to underlie the armrest in a locking relation thereto.

3. The subject matter of claim 1 and there being a recess in one side edge of said top wall of the shield to register with said aperture.

4. The subject matter of claim 1 and there being a recess in one side edge of said top wall of the shield to register with said aperture, said top wall where it borders said recess having a downwardly directed flange extending along the edge thereof.

5. A detachable shield mountable upon that type of conventional armrest of an automobile door wherein said armrest comprises a top portion with an upwardly directed elongated top surface the length of which is parallel to the inner face of the door, there being end and side surfaces extending downwardly from said top surface and a hand-grip aperture in its back side leading downwardly from said top surface, said shield comprising a horizontal top wall shaped to overlie the upper surface of said armrest, a wall extending rightangularly from an edge of said top wall and positioned to form an apron in front of the armrest when said shield is mounted thereon, that edge of said top wall which is opposite to said apron having a recess in its midlength portion to register with the upper end of the hand-grip aperture of the armrest to which the device is applied, and a tongue carried by said shield and extending downwardly from the front side of said recess to clamp said shield to said armrest in a protective relation to the latter.

6. The subject matter of claim 5 and downwardly directed end walls carried by said shield to overlie the end portions of the armrest.

7. A detachable armrest shield mountable upon the conventional armrest of an automobile door, said armrest being of that type wherein it comprises a top portion with an upwardly directed elongated top surface the length of which is parallel to the inner face of the door, there being end and side surfaces extending downwardly from said top surface and a hand-grip aperture in its back side leading downwardly from said top surface, said shield comprising a horizontal top wall shaped to overlie the upper surface of said armrest, an apron and end walls depending from said top wall in a position to overlie the front and sides of the armrest when said shield is mounted thereon, that edge of said top wall which is opposite to said apron having a recess in its midlength portion to register with the upper end of the hand-grip aperture of the armrest to which the device is applied, and a tongue carried by said shield and extending downwardly from the front side of said recess to clamp said shield to said armrest in a protective relation to the latter, the lower end portion of said tongue being bent so as to underlie the armrest in a locking relation thereto.

8. The subject matter of claim 7 and said top wall where it borders said recess having a downwardly directed flange extending along the edge thereof.

9. A shield detachably mountable upon an automobile door armrest of the type having a hand-grip aperture, said shield comprising an elongated, substantially rectangular top wall, an apron wall and end walls depending from said top wall, there being a recess in one side edge of said top wall to register with said hand-grip aperture when said shield is in the applied position, and said top wall where it borders said recess having a downwardly directed flange extending along the edge thereof and into said recess.

WALTER E. JECKELL.

REFERENCES CITED

The following references are of record in the file of this patent:

UNITED STATES PATENTS

| Number | Name | Date |
|---|---|---|
| 2,548,215 | Horch | Apr. 10, 1951 |